United States Patent [19]

Mueller et al.

[11] Patent Number: 6,142,253
[45] Date of Patent: *Nov. 7, 2000

[54] VEHICLE FRAME HAVING A STEP-THROUGH OPENING PARTICULARLY FOR A TWO-WHEELER

[75] Inventors: Helmut Mueller, Toening; Rainer Thoma; Markus Theobald, both of Munich, all of Germany

[73] Assignee: Bayerische Motoren Werke Aktiengesellschaft, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/895,903

[22] Filed: Jul. 17, 1997

[30] Foreign Application Priority Data

Jul. 24, 1996 [DE] Germany .......................... 196 29 879

[51] Int. Cl.[7] .............................. B62K 11/10; B60R 21/13
[52] U.S. Cl. .......................... 180/219; 180/311; 180/908; 280/781; 280/784; 280/756; 296/203.01; 296/102
[58] Field of Search .................................. 180/219, 227, 180/228, 311, 312, 908; 280/781, 784, 788, 797, 798, 756; 296/203.01, 205, 102, 189

[56] References Cited

U.S. PATENT DOCUMENTS

| | | | |
|---|---|---|---|
| 1,320,282 | 10/1919 | Scott | 180/219 |
| 1,924,363 | 8/1933 | Kanai | 180/227 |
| 4,311,335 | 1/1982 | Winiecki . | |
| 4,520,891 | 6/1985 | Omholt | 180/219 |
| 4,660,345 | 4/1987 | Browning | 296/205 |
| 4,798,399 | 1/1989 | Cameron | 280/756 |
| 4,799,708 | 1/1989 | Handa et al. | 296/205 |
| 4,973,082 | 11/1990 | Kincheloe . | |
| 5,327,989 | 7/1994 | Furuhashi et al. | 180/311 |
| 5,743,561 | 4/1998 | Kim | 180/219 |

FOREIGN PATENT DOCUMENTS

| | | |
|---|---|---|
| 2531490A1 | 2/1977 | Germany . |
| 4307089C2 | 9/1984 | Germany . |
| 3432088A1 | 2/1985 | Germany . |

(List continued on next page.)

OTHER PUBLICATIONS

German Search Report, Oct. 24, 1996, Application No. 196 29 878.4.
*Auto Technik Zukunft*, Nr. 25, 1999, entitled "Nur zwei Räder, dafür aber den doppelten Nutzen?".
*Auto Bild*, Aug. 10, 1996, entitled "Das Rollermobil von BMW".
Patent Abstracts of Japan, No. 05178251, Jul., 1993 and No. 07112681,May, 1995.

*Primary Examiner*—Peter C. English
*Attorney, Agent, or Firm*—Evenson, McKeown, Edwards & Lenahan, P.L.L.C.

[57] ABSTRACT

A vehicle frame is described which has a step-through opening, particularly for a two-wheeler, for a vehicle having a resilient front wheel suspension, a steering device for a front wheel, a resilient rear wheel suspension for at least one rear wheel, at least one seat device for a driver and at least one protection device which extends in front of, over and behind the driver and is designed such that a laterally open cage is created for the driver which permits the stepping-through, and having an engine which is mounted essentially in front of the rear wheel and below the seat device. The vehicle frame has at least one principal frame element which extends essentially in the longitudinal direction of the vehicle, specifically from the rear bottom, close to the engine, toward the front top, close to the steering device, in which case at least one further frame element is provided on each side below the principal frame element which extends at least in sections essentially in parallel to the vehicle contact surface and which forms a supporting surface for the respective foot of the driver. A safety belt device, a shoulder protection bow, a pelvis protection bow and a frame-fixed seat ramp are provided as additional safety devices.

43 Claims, 3 Drawing Sheets

FOREIGN PATENT DOCUMENTS

| | | |
|---|---|---|
| 3616847A1 | 11/1986 | Germany . |
| 3618164A1 | 1/1987 | Germany . |
| 3713137A1 | 11/1988 | Germany . |
| 94 10 306 | 6/1994 | Germany . |
| 195 05 448 | 8/1996 | Germany . |
| 296 14 125 | 2/1997 | Germany . |
| 49-19539 | 2/1974 | Japan . |
| WO 85/00568 | 2/1985 | WIPO . |
| WO 95/09760 | 4/1995 | WIPO . |

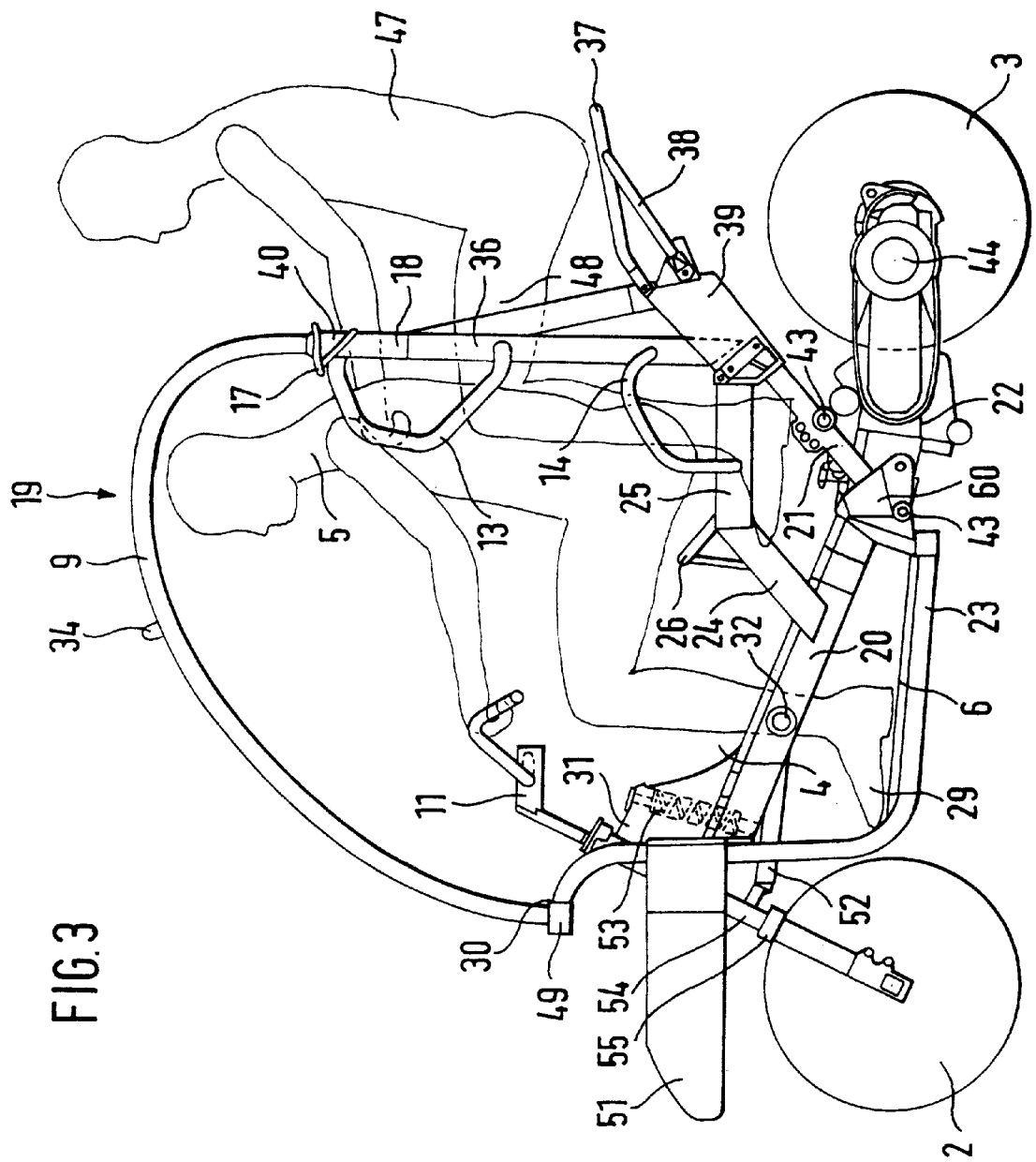

VEHICLE FRAME HAVING A STEP-THROUGH OPENING PARTICULARLY FOR A TWO-WHEELER

BACKGROUND OF THE INVENTION

This application claims the priority of German application 196 29 8792 filed in Germany on Jul. 24, 1996, the disclosure of which is expressly incorporated by reference herein.

The invention relates to a vehicle frame with a step-through opening, particularly for a two-wheeler, for a vehicle with a resilient front wheel suspension, a steering device for at least one front wheel, a resilient rear wheel suspension for at least one rear wheel, at least one seat device for a driver and at least one protection device which extends in front of, over and behind the driver and which is designed such that it results in a laterally open cage which permits a stepping-through by the driver, having an engine which is mounted essentially in front of or at the rear wheel and below the seat device.

German Utility Model G 94 10 306.2 describes a motor scooter having a foldable rain protection device. For the protection of the driver of a motor scooter with a power unit swinging fork and a step-through opening, this scooter has a foldable rain protection device. When this rain protection device is unfolded, it extends from an area behind the driver, over the driver, to in front of him. There it consists of a windshield which is mounted on a steering device.

A motor scooter of this type has the disadvantage that the whole vehicle has little resistance to torsion. This concerns the vehicle frame and the rain protection device. As a result, problems concerning driving dynamics may occur, such as swinging or wobbling. In addition, such a vehicle has an increased sensitivity to wind. In the case of a frontal impact of the motor scooter with an obstacle, the motor scooter can reduce only very little energy because, in the step-through opening, the vehicle frame is very unstable, will therefore deform there and in the process reduces or absorbs only very few forces. In addition, no safety devices are provided for the driver for such a case.

SUMMARY OF THE INVENTION

Based on the above, it is an object of the invention to provide a vehicle with a step-through opening, particularly a two-wheeler, whose vehicle frame reduces high forces in the case of a frontal impact on an obstacle and in the process deforms only very little and also protects the driver remaining within the vehicle frame by means of additional safety devices.

According to the invention, this object is achieved by providing an arrangement wherein at least one supporting principal frame element extends essentially in the longitudinal direction of the vehicle from the rear bottom, close to the engine to the front top, close to the steering device, and wherein at least one additional frame element is provided on each side below the principal frame element and extends at least in sections essentially in parallel to the vehicle contact surface bottom and forms a supporting surface for the respective foot of the driver.

According to the invention, a vehicle frame with a step-through opening is designed such that at least one supporting principal frame element extends essentially in the longitudinal direction of the vehicle, specifically from the rear bottom close to the engine, toward the front top close to the steering device, and in that, on each side, below the principal frame element, at least one additional frame element is provided which extends at least in sections essentially in parallel to the contact area of the vehicle and forms a support surface for the respective foot of the driver.

In the case of a direct connection between the front wheel suspension and the rear wheel suspension, a high frame stiffness is achieved by means of this principal frame element.

In the case of a preferred embodiment of the invention, the rear wheel suspension is resiliently mounted with the engine on the vehicle frame. Such a design of the rear wheel swinging fork is also called power unit swinging fork. If, in addition, two principal frame tubes are provided as principal frame elements, which extend on the left and right respectively laterally of the center plane of the vehicle, advantageously, additional front wheel and rear wheel suspension elements can be housed in a simple manner between the principal frame tubes which is favorable with respect to the power flux. In another preferred embodiment of the invention, at least one receiving body for the steering device is situated in the front between the principal frame tubes. This receiving body establishes a simply constructed connection.

If, in addition, as in an advantageous embodiment of the invention, the front wheel is, among other things, guided by means of at least one trailing arm which is mounted on the principal frame element and can be swivelled about a transverse axis of the vehicle, the position of the principal frame tubes can be selected such that the bearing axis of the trailing arm between the principal frame tubes leads to a kinematic arrangement which, during the braking of the vehicle, permits an only minimal compression of the vehicle. In this manner, an anti-dive control can be carried out in a simple fashion. Very favorable driving properties are achieved if the two principal frame parts extend from the front top, approximately at the level of the overall center of gravity of the vehicle, to the rear bottom, clearly below the driver's sitting level.

The bearing of the trailing arm between the two principal frame tubes considerably increases the vehicle stiffness, particularly in the lateral direction, and especially the stiffness of the front wheel suspension. As a result, natural vibrations of the vehicle, such as swinging and wobbling, are for the most part prevented. If the trailing arm is disposed directly in the principal frame tubes, an effective simple front wheel suspension is obtained which has few components.

In the case of another advantageous feature of preferred embodiments of the invention, additional frame elements are provided, starting out essentially from the center and/or from the rearward area of the principal frame element, which extend diagonally to the rear top and are connected with the principal frame element and/or the additional frame elements in order to carry at least the seat device.

This has the advantage that the step-through opening at the vehicle frame is constructed in an ergonomically favorable manner and simultaneously a high stiffness of the vehicle frame is achieved. This provides a handling safety for the driver when stepping in and out, stopping or putting on the safety belt. A high sitting comfort, as well as a high stepping-in and out comfort are connected with the above.

In the case of another advantageous feature of preferred embodiments of the invention, the seat device consists of a seat frame part which connects the additional frame parts essentially horizontally; of a seat ramp which is connected with the additional frame parts and/or the seat frame part and extends in the stepping area of the driver toward the top; and of a seat.

A seat device with a frame-fixed seat ramp on which the seat, for example, constructed as a seat bucket, is supported in the case of a frontal crash, advantageously prevents the displacing of the driver's pelvis toward the front and holds him on the seat in the pelvic region. This is advantageous for the driver particularly when safety belts are used because it prevents a diving-through by the driver under the safety belt in the pelvic area as a result of the targeted support. Furthermore, a frame-fixed seat ramp increases the overall stiffness of the vehicle frame.

In the case of another advantageous feature of preferred embodiments of the invention, the resilient rear wheel suspension is mounted on the principal frame element or on the additional frame elements starting out from the rearward area of the principal frame element or on their connection with the principal frame element and/or the further frame elements.

Such a mounting of the resilient rear wheel suspension, for example, the power unit swinging fork, has a simple construction and can be manufactured at reasonable cost. The clearance between the frame elements for the installation of the rear wheel suspension permits its construction with a wide bearing base. In the rearward area, principal frame tubes diverging from the vehicle frame center toward the respective side advantageously permit a favorable power flux from the front wheel suspension to the rear wheel suspension.

In another advantageous feature of preferred embodiments of the invention, a deformation device is situated above the front wheel and is supported at least on the principal frame element. In this case, the further frame elements behind the front wheel may extend essentially toward the front top and beyond the deformation device. Thus, it is possible in a simple manner that the deformation device is supported on the further frame elements and the further frame elements are connected with the principal frame element directly or by way of the receiving body for the steering device and/or with one another.

The deformation device above the front wheel can advantageously reduce high impact forces and/or introduce them into the vehicle frame. In this case, it is very advantageous for the deformation device to have a wide supporting base. This wide supporting base for the deformation element will exist if the two principal frame tubes lead from the vehicle frame center in the forward area of the vehicle frame toward the outside or adjoin a cross strut corresponding approximately to the vehicle width. At the same time, in an ergonomically favorable manner, a free space for the driver's feet can be designed on the left and the right beside the principal frame tubes. If the deformation device is at least at the level of the center of gravity of the vehicle and in an arrangement which permits the first-contact point at this level with an obstacle, in the case of an impact, an overturning of the vehicle is advantageously prevented. If the additional frame elements are connected with one another by way of the deformation device, the stability of the vehicle frame will advantageously increase even more.

In another feature of advantageous embodiments of the invention, the survival space for the driver is maintained in that the protection device extending in front of, above and behind the driver is mounted behind the driver on the additional frame elements and/or on the seat frame part and/or on their connection, for example, a junction element, and, in front of the driver, is mounted on the further frame elements and/or on their connection and/or on the principal frame element. The protection device consists of at least two spars which extend on one side respectively of the vehicle and are connected with one another. In this case, it is also advantageous for one shoulder protection bow respectively to be mounted on each spar which protrudes over the contour of the protection device toward the respective side. In addition, a pelvis protection bow is advantageously mounted on each spar and/or on the additional frame elements and/or on the seat frame part and/or on the junction element toward the side, which pelvis protection bow also protrudes over the contour of at least the protection device toward the side. These protection bows protect the driver toward the side. In this case it is advantageous for the seat to be additionally fastened on the protection device.

In order to prevent that the driver falls out of the survival space, a safety belt device exists for him according to another advantageous feature of preferred embodiments of the invention and is fastened on the vehicle frame and/or on the seat. This safety belt device fixes the driver advantageously on the seat and on the vehicle frame in a particularly advantageous manner if it is provided with an automatic belt retracting and/or belt blocking device. Thus, in the normal driving operation, the driver can move relative to the seat and to the vehicle frame while, under conditions which occur during an impact or in the case of a fall, he is fixed on the vehicle. If it is to be possible to put the safety belt device on manually, it is advantageous for at least one so-called three-point belt with a belt retracting and/or belt blocking device to be used. The requirement of fastening the driver in the case of a possible single-hand operation of the safety belt device by way of at least four points on the vehicle frame is met if two three-point belts are mounted, one respectively on one side of the vehicle seat with a belt buckle on the respective other side. However, it is also possible to combine a three-point belt with a two-point belt, to form a so-called diagonal belt.

For the power flux, it is particularly advantageous if the safety belt device has a deflecting device for at least one belt strap which is mounted on the protection device and which is supported on it in the case of a deforming load. As a result, the deflecting device is advantageously considerably stiffened.

In another advantageous feature of preferred embodiments of the invention, the protection device is divided into at least two parts; specifically into a back part behind the driver which is fixedly connected with the vehicle frame and a top part which is detachably fastened to the vehicle frame, at least over and in front of the driver. As a result, the respective parts of the protection device can advantageously be constructed in a simple manner to correspond to the different loads.

The connection between the two parts of the protection device has a very simple construction if, by means of the deflection device, the top part is form-lockingly connected with the back part and is form-lockingly and/or frictionally connected with the vehicle frame by means of clamps mounted in the front on the vehicle frame.

In another advantageous arrangement of preferred embodiments of the invention, a windshield is mounted at least in the area in front of the driver, at least between the two spars of the protection device. This windshield protects the driver advantageously from the influences of weather as well as from objects penetrating into the survival space.

In other advantageous features of preferred embodiments of the invention, supplementary frame parts which extend toward the rear over the rear wheel are mounted on the additional frame elements and/or on the protection device and/or on the seat device and/or on the junction element behind the driver. On these supplementary frame parts, a rear wheel covering is mounted in which a stowage space is constructed. Further, this covering can be constructed in its upper area as a seat for a passenger. This has the advantage that the passenger and the driver are separated by the protection device situated between them. They can exercise no forces upon one another. In the chest area, a defined cushioning for the passenger can be provided on the protection device for absorbing energy. The safety of the passenger is increased in that he is supported by way of the back part of the protection device and therefore participates in the vehicle deceleration without exercising any forces upon the driver. If at least one removable stowage space can be fastened on the rear wheel covering or on the supplementary frame parts, this has the advantage that the passenger seat can also be used for transporting luggage.

In order to keep the spreading of the passenger's thighs as small as possible, it is advantageous for the back part of the protection device to be constructed as narrow as possible in the passenger's crotch area in that the spars of the back part toward the longitudinal center plane of the vehicle frame are recessed at least in the area of the passenger seat.

In another advantageous arrangement of preferred embodiments of the invention, the frame elements consist of extruded profiles, for example, of extruded light-metal profiles. These are held together at least partially by junction elements, for example, cast nodes, in which case, for example, the receiving body for the steering device and/or the seat ramp and/or the connections of the frame elements are constructed as junction elements. In this manner, the vehicle frame can advantageously be constructed in a very simple manner and at reasonable cost. In addition, this is a weight-saving construction even when the frame structure is complicated.

Other objects, advantages and novel features of the present invention will become apparent from the following detailed description of the invention when considered in conjunction with the accompanying drawings.

BRIEF DESCRIPTION OF THE DRAWINGS

FIG. 3 is a lateral schematic view of a two-wheeler according to the invention without any covering and an outlined driver and passenger.

DETAILED DESCRIPTION OF THE DRAWINGS

Figure 1:
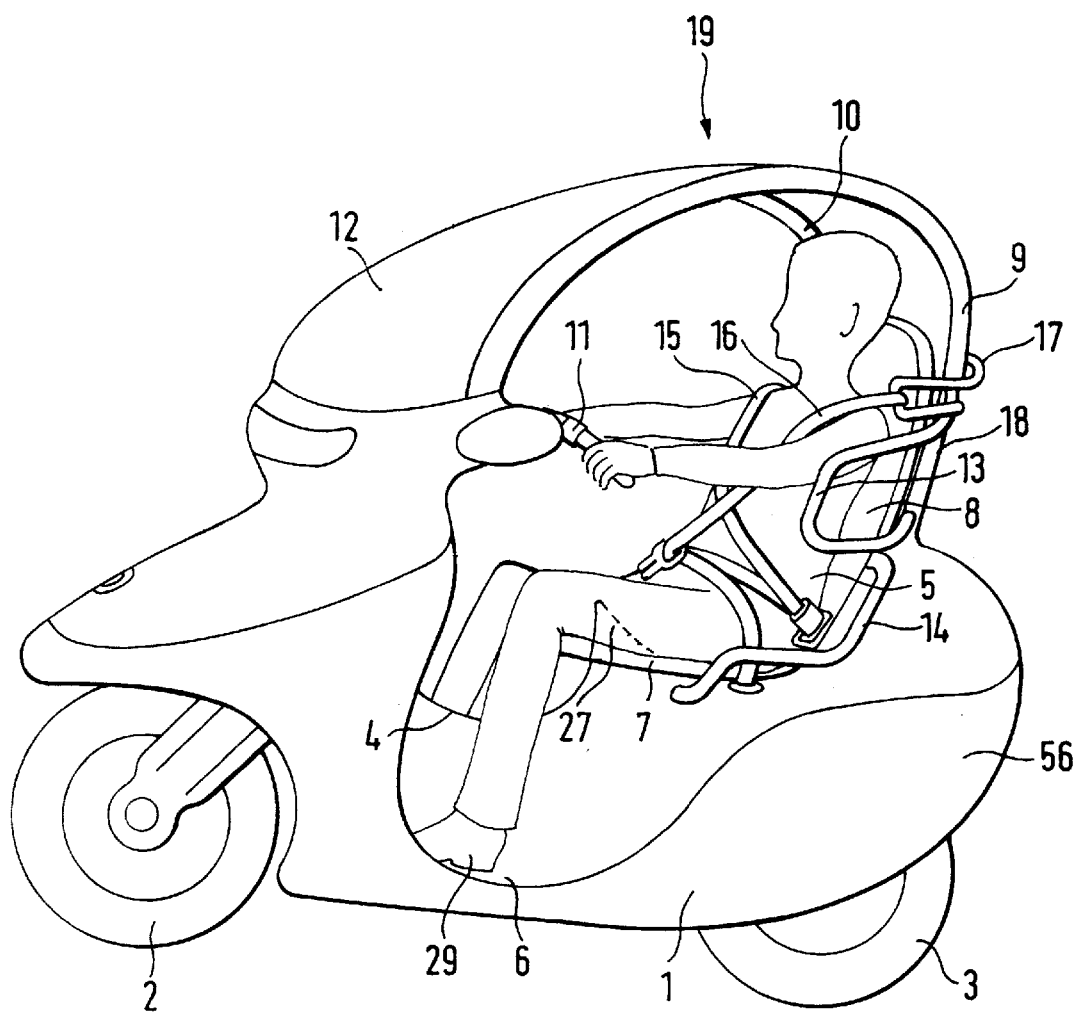
FIG. 1 is a perspective overall view of a covered two-wheeler with a vehicle frame corresponding to the invention and a driver who is wearing a safety belt system.

FIG. 1 illustrates a covered two-wheeler or two wheel motorcycle assembly with a vehicle frame for accommodating a stepping through of the driver, corresponding to the invention. Because of a covering 1, only a few parts of the vehicle frame are visible in FIG. 1. The covering 1 extends essentially over the lower frame unit of the two-wheeler from the front by way of the front wheel 2 toward the rear over the rear wheel 3. The vehicle frame beneath step-through opening 4 is also covered. Of the vehicle frame, a protection device is visible which is designed such that a cage is obtained for the driver 5 which is open on the sides and permits a stepping through. This cage is essentially bounded by a supporting surface 6 for the respective foot 29 of the driver 5 which merges toward the top changes into the step-through opening 4 and a seat 7 for the driver 5 which is fastened to a seat device which is not shown and is constructed as a seat bucket with a back part 8 which bounds the cage for the driver 5 toward the rear.

Furthermore, mutually connected spars 9, 10 (35, 36, FIG. 2) extend behind the back part 8 of the seat bucket and are part of a protection device which extends in front of, over and behind the driver in each case on one side of the two-wheeler over the driver 5 toward the front in front of a steering device 11. In the area in front of the driver 5, a windshield 12 is mounted between the two spars 9, 10.

A shoulder protection bow 13 which projects toward the respective side over the contour at least of the protection device is mounted on the spars 9, 10, 35, 36. A pelvis protection bow 14, which projects also over the contour at least of the protection device toward the side is fastened on each spar 35, 36 and/or on additional frame elements 21, 24 not visible in this figure and/or on a seat frame part 25 not visible in this figure and/or on a junction element 39 which is also not visible in this figure. In addition, the seat 7 is fastened with its back part 8 on the protection device. As a result, a stability is achieved in that a safety belt device can be provided for the driver 5 which is fastened on the vehicle frame and/or on the seat 7 with the back part 8. The safety belt device consists of two so-called three-point belts for the driver 5 of which each is mounted on one side of the two-wheeler and can be fastened on the other side of the two-wheeler on it by way of a belt buckle. Thus, in the case of an accident, the driver 5 is protected by the vehicle frame, among other things, because he is fastened by means of the safety belt device on the seat 7 with the back part 8 by way of at least four points in the vehicle, at least two in the proximity of the pelvis and two in the proximity of the shoulders.

In the normal driving operation, the driver 5 can essentially move freely on the seat 7 because of the use of not visible automatic safety belt retraction and blocking devices for the two so-called three-point belts, which contributes to the secure steering of a two-wheeler and is made possible by this safety belt device. Another advantage is the fact that the two three-point belts can be put on successively. This permits a single-hand operation of the safety belt device, in which case, during the putting on of the so-called three-point belts by hand, the driver's other hand can remain, for example, on the steering device 11 in order to maintain the balance of the two-wheeler.

For deflecting the two safety belt straps 15, 16, a deflection device is provided in the proximity of the driver's 5 shoulders which consists of one deflection bow 17 respectively for each of the safety belt straps 15, 16. Each deflection bow 17 is mounted on the protection device behind the driver 5 and is supported on the protection device in the case of a deforming load.

Furthermore, the protection device is divided into two parts; specifically into a back part 18 behind the driver 5 which is fixedly connected with the vehicle frame and a top part 19 which is detachably fastened to the vehicle frame, at least over and in front of the driver 5. The top part 19 is connected with the back part 18 in a form-locking manner by means of the deflection bows 17 and is connected in a frictional manner with the vehicle frame by clamps which are not visible and are mounted in the front on the vehicle frame. The connection between the back part 18 and the top part 19 of the protection device is achieved in that the two are fitted into one another , and each deflection bow 17 is fitted with its end into a bore through the top part 19 and the back part 18 and with its other end is connected by screws with the back part 18. In the case of a deforming load, the deflecting bow 17 comes to rest against the protection device, whereby a considerable stiffening is achieved.

Figure 2:
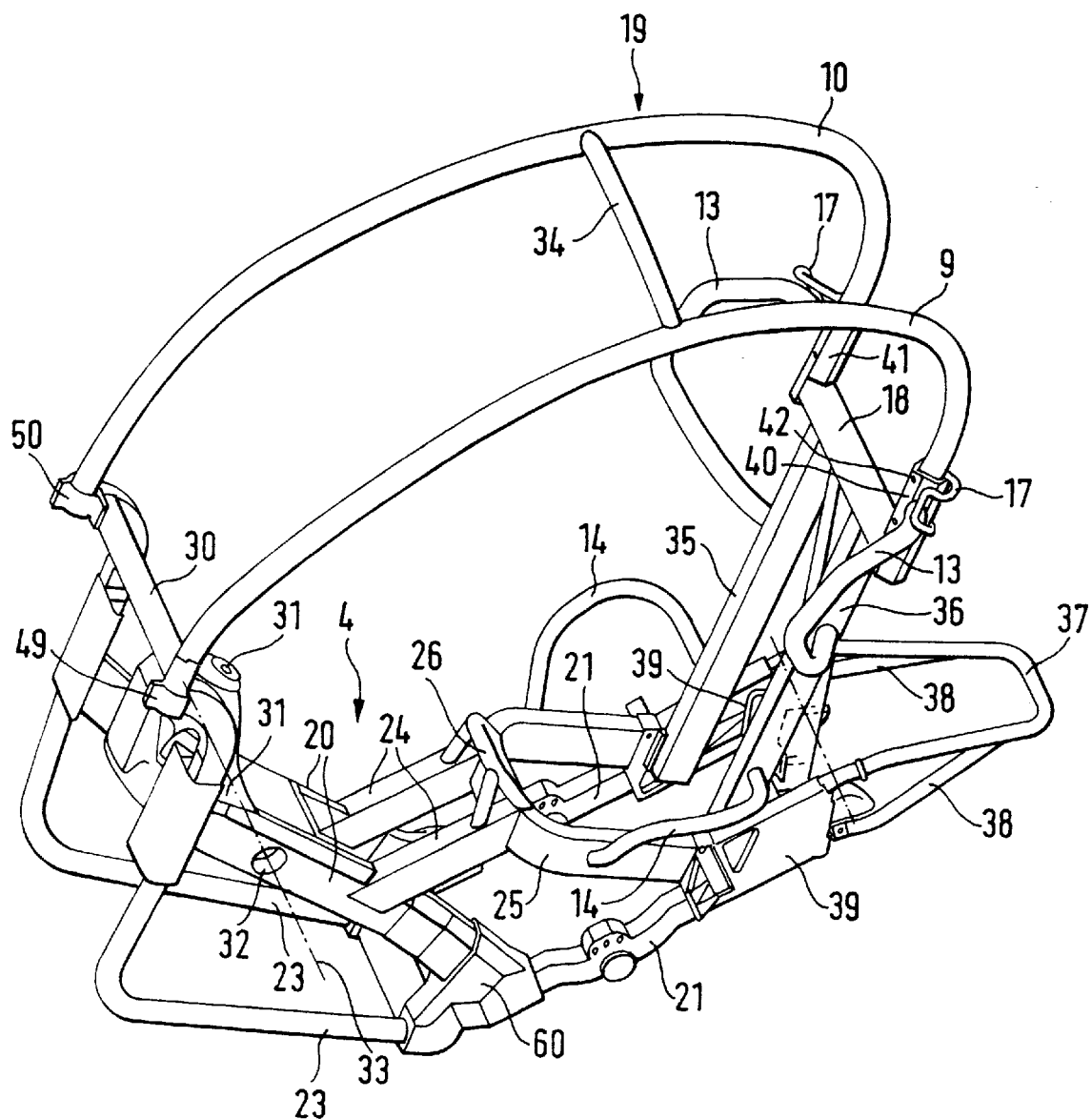
FIG. 2 is a perspective view of the vehicle frame for the vehicle of FIG. 1.

FIG. 2 shows a portion of the vehicle frame without the covering 1. Two principal frame tubes 20 extending in parallel in each case on the left and the right laterally of a center plane of the vehicle to form a principal frame element which extends essentially in the longitudinal direction of the vehicle from the rear bottom, close to the engine 22 (FIG. 3), to the front top, next to the steering device 11 (FIG. 1). The two principal frame tubes 20 diverge in the front and the rear toward the side and are connected at their ends with further frame elements 23 and additional frame elements 21. The additional frame elements 21, 24, which start out essentially from the center and from the rearward area of the principal frame tubes 20, extend diagonally toward the rear top in order to support the seat device. The seat device consists of a seat frame part 25 which connects the additional frame elements 21, 24 essentially horizontally and of a seat ramp 26 which is connected with the additional frame elements 24 and/or the seat frame part 25 and extends upwards in the driver's 5 crotch area. The seat 7, which is not shown here, is mounted on this seat device. It has an upward-directed curvature 27 (FIG. 1) for the seat ramp 26 which has the effect that a shifting of the driver 5 toward the front in the case of a frontal impact is prevented in cooperation with the safety belt device.

One further frame element 23 respectively extends on each side below the two principal frame tubes 20 at least in sections essentially in parallel to the vehicle contact surface (bottom road contact surface) and forms a supporting surface for the respective foot 29 (FIG. 1) of the driver 5. Because of the diagonally extending principal frame tubes 20 and because of the course of the additional frame elements 24 which are connected with the principal frame tubes 20 approximately in the center of the principal frame tubes 20, the stepping through the step-through opening 4 is permitted for the driver 5.

The further frame elements 23 extend from the supporting surface 6 for the respective foot 29 of the driver 5 toward the front top and there are connected with one another at the level of the start of the protection device for the driver 5. In addition to being connected by this connection 30, the further frame elements 23 are also linked to a receiving body 31 for the steering device 31 by way of the inwardly recessed principal frame parts 20. The receiving body 31 for the steering device 11 also connects the two principal frame tubes 20 in the forward area of the vehicle frame. In this area, the principal frame tubes 20 also have bearing bores 32 for receiving a leading arm 52 not shown in this FIG. 2 (see FIG. 3) which guides the front wheel 2 swivellably about an outlined transverse axis 33 of the vehicle. The leading arm 52 is received by the bearing bores 32 between the two principal frame tubes 20.

A deformation element 51 (FIG. 3), which is not shown in FIG. 2, above the leading arm 52 is not only supported on the principal frame tubes 20 but also on the further frame elements 23 which extend behind the front wheel 2, essentially toward the front top and beyond the deformation device.

The protection device for the driver 5, which extends toward the rear top in front of and then over the driver 5 and consists of the spars 9, 10 which are connected with one another by means of a cross strut 34 extending in the transverse direction of the vehicle, starts above the leading arm 52 (FIG. 3) in the area of the connection 30.

A windshield 12, which is not shown in FIG. 2, is situated between the spars 9, 10. Behind the driver, the spars 9, 10 of the top part 19 of the protection device which is over and in front of the driver 5 extend downward. They change into the back part 18 of the protection device which is fixedly connected with the vehicle frame and extends behind the driver 5. The back part 18 is fastened in the rearward area of the seat frame part 25. The spars 35, 36 of the back part 18 are recessed toward a longitudinal center plane of the vehicle frame with respect to the spars 9, 10. This has the purpose of creating space for the legs of a passenger 47 (FIG. 3) and for whom a rear wheel covering 56 (FIG. 1) is constructed in its upper area as a seat. This rear wheel covering is mounted on supplementary frame parts 37, 38, in which case a stowage space may be constructed in it.

The supplementary frame parts 37, 38 are connected with the seat frame part 25 and the back part 18 of the protection device and also with the additional frame elements 21 on each side of the two-wheeler by way of a junction element 39. Frame parts 37, 38 extend behind the driver 5 toward the rear over the rear wheel 3. It is also provided that, instead of accommodating the passenger 47 (FIG. 3), the rear wheel covering 56 (FIG. 1) or the supplementary frame parts 37, 38 may have at least one mountable and removable stowage space which is not shown.

As additional protection devices for the driver 5, shoulder protection bows 13 and pelvis protection bows 14, which each extend beyond the lateral contour, are mounted on the vehicle frame. The pelvis protection bows 14 connect the seat frame part 25 with the back part 18, while the shoulder protection bows 13 are mounted on the back part 18. In this case, the back part 18 and the top part 19 of the protection device for the driver 5 are connected by way of the deflection bows 17 for the safety belt straps 15, 16 (FIG. 1). Because of the fact that the spars 9, 10 are fitted into receiving tubes 40, 41 of the back part 18 and the deflection bows 17 are in each case fitted through a transverse bore 42 through the receiving tubes 40, 41 and the spars 9, 10, this form-locking plug-type connection fixes the respective spar 9, 10 in the respective receiving tube 40, 41 of the back part 18. Another end of the deflection bow 17 is screwed to the respective receiving tube 40, 41 for fastening the deflection bow 17. In the case of a deforming effect of force onto a shoulder protection bow 13, the latter will be placed against the deflection bow 17 which results in a stiffening of the shoulder protection bow 13. By adapting the wire thickness, a belt force limitation can be implemented in the case of the deflection bow 17 by its targeted deformation.

A resilient rear wheel suspension for at least one rear wheel 3 (FIG. 1) is accommodated in other bearing bores 43 in the additional frame elements 21. However, the further bearing bores 43 may also be provided on the connection—junction element 60—, of the additional frame elements 21 with the further frame elements 23, and the principal frame tubes 20 (FIG. 3). The resilient rear wheel suspension may also consist of a power unit swinging fork in the case of which the engine 22 (FIG. 3) with the rear wheel suspension is resiliently mounted on the vehicle frame.

This is illustrated in FIG. 3. Supported by a spring element and/or damper element which is not shown, a power unit swinging fork 44 with the rear wheel 3 and the engine 22 is mounted on the connection—junction element 60—of the further frame elements 23 with the principal frame tubes 20 and the additional frame elements 21 so that it can be rotated about another transverse axis of the vehicle. Among other devices, the additional bearing bores 43 on the junction element 60 are used for this purpose. The engine 22 is situated essentially in front of the rear wheel 3 and below the seat device for the driver 5.

A passenger 47 sits above the rear wheel 3 on a rear wheel covering 56 (FIG. 1) which, in its upper area, is constructed as a seat and is not shown in this figure. The back part 18 of the protection device for the driver 5 extends between the driver 5 and the passenger 47 and is recessed in the area of the passenger's 47 legs 48 toward the vehicle center. In its further course, the protection device for the driver 5 extends over the driver toward the front bottom to a connection 30 on which it is received in a frictionally connected manner in clamps 49, 50 (FIG. 2). Below the connection 30 and in front of the steering device 11, the deformation element 51 is situated. It extends over the front wheel 2 at a level above the overall center of gravity of the vehicle which has the effect that the vehicle will not overturn in the case of a frontal impact.

The resilient front wheel suspension by way of the leading arm 52 and the receiving body 31 of the steering device 11, like the deformation element 51, is capable of reducing very high forces during an impact and to transmit the forces into the principal frame tubes 20.

By way of a spring strut 53 (illustrated by a broken line because it is not visible), the leading arm 52 is supported by means of a damping device on the vehicle frame. The front wheel 2, which is guided by way of telescopic tubes 54, is resiliently supported by way of a lower fork bridge 55 between the telescopic tubes 54 by way of the leading arm 52.

The principal frame tubes 20, the further frame elements 23, the additional frame elements 21, the seat frame part 25, the back part 18 and the supplementary frame parts 37, 38 are extruded profiles which are connected by junction elements. In this case, it is also contemplated to connect other connection points between the extruded profiles, for example, between the additional frame elements 24 and the seat frame part 25, also by way of junction elements. In the example shown, the seat ramp 26 can then be constructed as a junction element. Light metal is preferably used as the material for the extruded profiles. The junction elements are also preferably cast or forged from light metal.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Vehicle frame having a step-through opening for a vehicle having at least two wheels, a resilient front wheel suspension, a steering device for at least one front wheel, a resilient rear wheel suspension for at least one rear wheel, at least one seat device for a driver and at least one protection device which extends in front of, over and behind the driver and which is designed such that it results in a laterally open cage which permits a stepping-through by the driver, having an engine which is mounted adjacent the rear wheel, wherein at least one supporting principal frame element extends essentially in the longitudinal direction of the vehicle from a rear bottom of the vehicle frame, close to the engine, to a front top of the vehicle frame, close to the steering device, and wherein at least one further frame element is provided on each side below the principal frame element at least a portion of which extends essentially in parallel to a vehicle contact surface bottom and forms a supporting surface for a respective foot of the driver wherein the engine is mounted to the rear of said further frame element.

2. Vehicle frame according to claim 1, wherein the engine with the rear wheel suspension is resiliently mounted on the vehicle frame.

3. Vehicle frame according to claim 2, wherein a windshield is mounted at least in the area in front of the driver at least between two spars of the protection device.

4. Vehicle frame according to claim 1, wherein the at least one principal frame element comprises two principal frame tubes which extend in parallel on the left and the right of a center plane of the vehicle.

5. Vehicle frame according to claim 4, wherein the two principal frame tubes are connected at a front portion of the vehicle frame by at least a receiving body for the steering device or a spring strut.

6. Vehicle frame according to claim 5, wherein the at least one further frame element is connected in a forward area of the vehicle with the two principal frame elements directly or through the receiving body for the steering device or the spring strut.

7. Vehicle frame according to claim 6, wherein a deformation device mounted above the front wheel is supported at least on the two principal frame elements.

8. Vehicle frame according to claim 7, wherein the at least one further frame element extends behind the front wheel essentially in the upward direction and beyond the deformation device.

9. Vehicle frame according to claim 8, wherein the deformation device is supported on the at least one further frame element.

10. Vehicle frame according to claim 9, wherein the at least one further frame element includes two elements connected with one another by way of the deformation device.

11. Vehicle frame according to claim 1, wherein the front wheel is guided at least partially by at least one leading arm which is mounted on the principal frame element and can be pivoted about a transverse axis of the vehicle.

12. Vehicle frame according to claim 11, wherein the at least one principal frame element comprises two principal frame tubes which extend in parallel on the left and the right of a center plane of the vehicle.

13. Vehicle frame according to claim 12, wherein the leading arm extends rearwardly between the two principal frame tubes and is pivotally disposed between them.

14. Vehicle frame according to claim 1, wherein additional frame elements are provided which extend diagonally essentially from the center or rearward area of the at least one principal frame element toward a rear top of the frame and are connected with the principal frame element in order to carry at least the seat device.

15. Vehicle frame according to claim 14, wherein the seat device includes:

a seat frame part, which essentially horizontally connects the additional frame elements, a seat ramp, which is connected with the additional frame elements and the seat frame part and extends upward in the driver's crotch area, and a seat.

16. Vehicle frame according to claim 14, wherein the resilient rear wheel suspension is mountable on the at least one principal frame element.

17. Vehicle frame according to claim 10, wherein a deformation device mounted above the front wheel is supported at least on the at least one principal frame element.

18. Vehicle frame according to claim 12, wherein the at least one further frame element extends behind the front wheel essentially in the upward direction and to beyond the deformation device.

19. Vehicle frame according to claim 14, wherein the protection device, which extends in front of, over and behind the driver, is mounted behind the driver on the at least one further frame element.

20. Vehicle frame according to claim 14, wherein supplementary frame parts which extend toward the rear over the rear wheel are mounted on at least one of the additional frame elements and the protection device and the seat device behind the driver.

21. Vehicle frame according to claim 20, wherein a rear wheel covering is fastened on the supplementary frame parts.

22. Vehicle frame according to claim 1, wherein a deformation device mounted above the front wheel is supported at least on the at least on e principal frame element.

23. Vehicle frame according to claim 22, wherein the deformation device is supported on the at least one further frame element.

24. Vehicle frame according to claim 22, wherein the at least one further frame element includes two elements connected with one another by way of the deformation device.

25. Vehicle frame according to claim 1, wherein the protection device consists at least of two mutually connected spars which extend on each side of the vehicle respectively.

26. Vehicle frame according to claim 25, wherein one shoulder protection bow respectively is mounted on each spar and protrudes over the contour of at least the protection device toward a respective side thereof.

27. Vehicle frame according to claim 26, wherein a pelvis protection bow, which protrudes over the contour of at least the protection device, is mounted on each spar and the seat device.

28. Vehicle frame according to claim 25, wherein a pelvis protection bow, which protrudes over the contour of at least the protection device, is mounted on each spar and the seat device.

29. Vehicle frame according to claim 25, wherein at least one spar of a back part of the frame is recessed toward a longitudinal center plane of the vehicle with respect to said spars of the protection device.

30. Vehicle frame according to claim 1, wherein the seat device is additionally fastened on the protection device.

31. Vehicle frame according to claim 1, comprising a safety belt device for the driver which is fastened on the vehicle frame or on the seat device.

32. Vehicle frame according to claim 27, wherein the safety belt device has a deflection device for at least one safety belt strap which is mounted on the protection device and is supported in case of a deforming load.

33. Vehicle frame according to claim 1, wherein the protection device is divided into at least two parts, including a back part behind the driver which is fixedly connected with the vehicle frame and a top part detachably fastened on the vehicle frame, at least over and in front of the driver.

34. Vehicle frame according to claim 33, wherein the top part is form-lockingly connected with the back part by means of a deflection device and is frictionally or form-lockingly connected with the vehicle frame by means of clamps mounted in front on the vehicle frame.

35. Vehicle frame according to claim 1, wherein the frame elements are extruded profiles made of a light metal.

36. Vehicle frame according to claim 35, wherein the extruded profiles are connected at least partially by junction elements.

37. Vehicle frame according to claim 36, wherein receiving bodies for at least one of the steering device, a spring strut, a seat ramp, and connections of the frame elements are constructed as junction elements.

38. A two-wheel motorcycle assembly having a front wheel and a rear wheel and including a seat device for a driver, a protective device which in use extends over said seat device, and a lower frame unit serving together with the protection device to form a laterally open step-through cage for a driver, said lower frame unit comprising:

at least one principal frame element extending rearwardly essentially in a longitudinal direction of the motorcycle assembly from a forwardly disposed steering device toward the seat device under which is positioned an engine, and at least one further frame element connected to the at least one principal frame element and extending substantially parallel to a road contact surface of the motorcycle assembly when in an in use driving position and forming a driver foot support wherein the engine is mounted adjacent to said rear wheel and to the rear of said further frame element.

39. An assembly according to claim 38, wherein said at least one principal frame element includes a pair of principal frame elements disposed laterally spaced from one another and connected to one another.

40. An assembly according to claim 39, wherein said at least one further frame element includes a pair of laterally spaced further frame elements connected respectively to respective ones of said principal frame elements.

41. An assembly according to claim 40, wherein said protective device includes a pair of spar members which extend from a position forwardly of the steering device to a position rearwardly of the seat device, said spar members being connected with the lower frame unit.

42. An assembly according to claim 41, further comprising a resilient front wheel suspension supported at said at least one principal frame element for pivotal movement with respect thereto.

43. An assembly according to claim 42, further comprising a rear resilient wheel suspension pivotally supported with respect to the lower frame unit.

* * * * *